May 27, 1958        R. L. LONGINI        2,836,521
HOOK COLLECTOR AND METHOD OF PRODUCING SAME
Filed Sept. 4, 1953        3 Sheets-Sheet 1
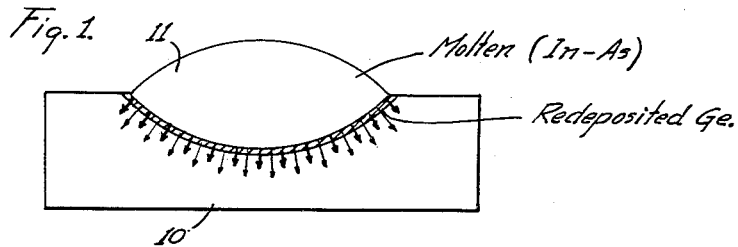
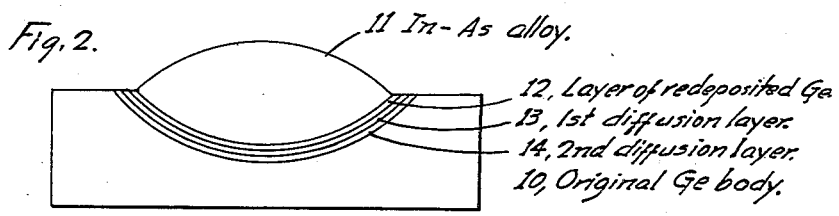
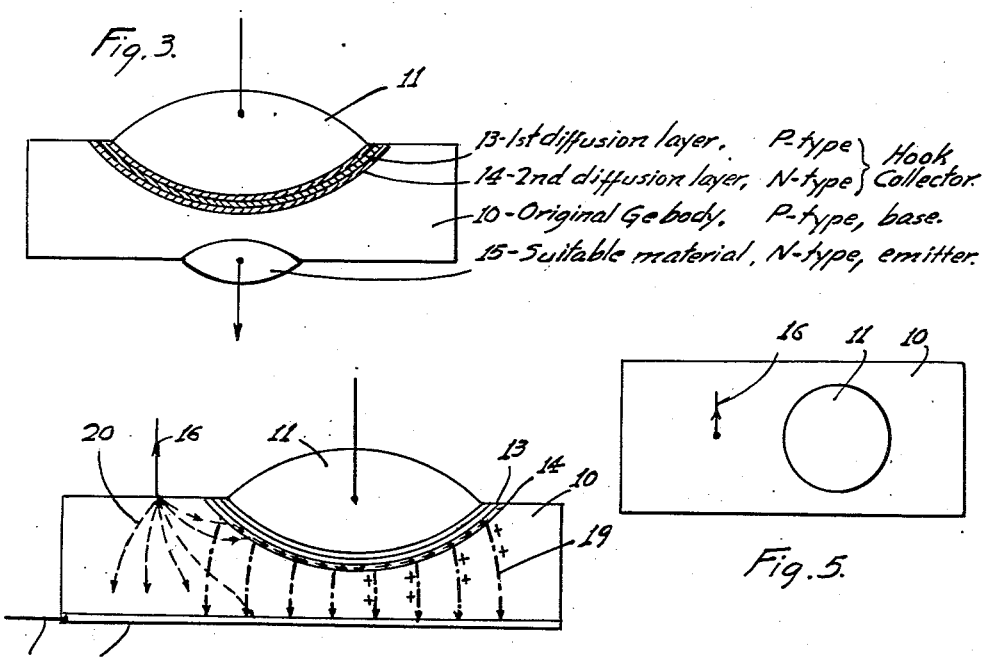
INVENTOR.
Richard L. Longini.
BY
Frederick Shapoe
ATTORNEY May 27, 1958 R. L. LONGINI 2,836,521
HOOK COLLECTOR AND METHOD OF PRODUCING SAME
Filed Sept. 4, 1953 3 Sheets-Sheet 2

INVENTOR.
Richard L. Longini.
BY
Frederick A. Lepore
ATTORNEY

May 27, 1958 R. L. LONGINI 2,836,521
HOOK COLLECTOR AND METHOD OF PRODUCING SAME
Filed Sept. 4, 1953 3 Sheets-Sheet 3

INVENTOR.
Richard L. Longini.
BY
Frederick Shapor
ATTORNEY

United States Patent Office 2,836,521
Patented May 27, 1958

---

2,836,521

HOOK COLLECTOR AND METHOD OF PRODUCING SAME

Richard L. Longini, Pittsburgh, Pa., assignor to Westinghouse Electric Corporation, East Pittsburgh, Pa., a corporation of Pennsylvania Application September 4, 1953, Serial No. 378,567

7 Claims. (Cl. 148—1.5)

This invention relates to the class of electrical devices, such as transistors and rectifiers, which utilize semi-conductive materials.

In the transistor art the part of a transistor to which the output lead is connected is called the "collector." A particular type of collector is known as a "hook collector" because of a certain "hook" in the curve representing the distribution of potential in the transistor body. The presence of the "hook" produces a transistor that amplifies current.

The present invention provides an improved "hook collector" in which the width of the region which causes the "hook" can be precisely controlled in both thickness and conductivity and may be made extremely thin so that the current amplification of the resulting device may be quite large.

The invention also includes a method of producing the improved "hook collector."

In addition, the invention includes new combinations of components to produce new and highly desirable characteristics in the resulting devices.

These, and other objects and advantages of the invention will become apparent as the description proceeds.

In the drawings,

Fig. 1 is a diagrammatic cross section illustrating the method of the invention.

Fig. 2 is a view similar to Fig. 1, but showing the different layers resulting from diffusion.

Fig. 3 is a view similar to Fig. 2 but showing a completed transistor.

Fig. 4 is a diagrammatic cross section illustrating a different type of transistor.

Fig. 5 is a diagrammatic plan view of the device of Fig. 4.

Figure 6:
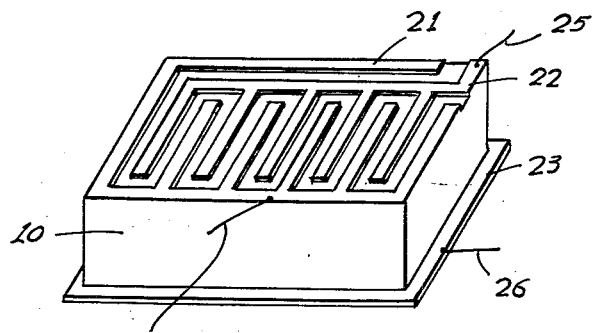
Fig. 6 is a perspective view illustrating another type of transistor.

A specific illustrative example will first be described.

To form a hook collector having a P-type base region I first provide a body 10 of germanium which has been "doped" with one of the P-type impurities, such as indium, to produce a body having the desired P-type conductivity. This P-type body will form the "base" of the resulting transistor.

I also provide a pellet 11 of an alloy containing about 0.1% arsenic, balance indium. Arsenic is an N-type impurity having a fast rate of diffusion, while indium is a P-type impurity having a slower rate of diffusion.

The pellet of indium-arsenic alloy is placed on the body of P-type germanium and the assembly is heated to about 570° C. to cause the indium-arsenic pellet to melt and to alloy with the germanium body. Some germanium dissolves in the molten pellet. The unit is then cooled slowly (i. e. over a period of 5 min.) to approximately 550° C.

During this cooling from 570° C. to 550° C. it is preferred to maintain the main body 10 of germanium cooler than the liquid alloy, as disclosed in co-pending patent application Ser. No. 374,547, filed August 17, 1953. This "gradient cooling" results in a favorable redeposition of germanium from the molten alloy onto the main body 10 of germanium. However, in some cases this drop in temperature may be omitted, as other advantageous features of the invention may be used without this feature.

The assembly is now held at the 550° C. temperature for a diffusion period of from one-half to one hour.

During the diffusion period the indium and arsenic both diffuse into the germanium, as indicated diagrammatically by the arrows in Fig. 1. Due to its slower rate of diffusion the indium does not penetrate as far as the arsenic, and due to the higher percentage of indium in the pellet 11, the percentage of indium will be higher in the first diffusion layer, which is the layer formed immediately adjacent to the pellet 11. This dense indium diffusion is indicated by the heavy arrows in Fig. 1.

Meanwhile, the arsenic, with its faster diffusion rate, has diffused farther into the germanium, and forms a second diffusion layer extending beyond the first diffusion layer. However, since only a small percentage of arsenic is present in the alloy pellet 11, the concentration of arsenic in this second diffusion layer is not very great. The arsenic diffusion is indicated by the light arrows in Fig. 1.

At the end of the diffusion period the assembly is cooled to room temperature.

The condition of the assembly after the diffusion period is indicated diagrammatically in Fig. 2, which shows that the button 11 of indium-arsenic alloy is alloyed to the body 10 by the following intermediate layers:

A layer 12 of redeposited germanium, which contains some indium and arsenic;

A 1st diffusion layer 13, which contains a small percentage of arsenic with a relatively much larger percentage of indium. The amount of indium present in this layer must be enough to overcome the influence of the arsenic and to cause this layer to have P-type character; and A 2nd diffusion layer 14 in which the concentration of arsenic is greater than that of indium, and since arsenic is an N-type material this layer is converted to N-type material.

Since the different diffusion rates of indium and arsenic are known, the time and temperature of the diffusion period can be chosen so as to produce a very thin and uniform 2nd diffusion layer, which is an important factor in producing the improved "hook collector."

To form a completed transistor from the assembly of Fig. 2 any suitable "emitter" may be added. Thus, Fig. 3 shows the assembly completed by alloying to the opposite side of body 10 a button 15 of any preferred N-type material. In this case the button 15 forms the "emitter," the original body 10 forms the "base," and the layers 13 and 14 form the "hook collector."

In the above description certain preferred materials have been mentioned in order to give concrete examples. It should be understood that other materials having similar properties may be substituted within the principles now to be explained.

A. MAIN BODY HAVING P-TYPE PROPERTIES

*Materials for main body*

For the main body 10, it is possible to use any suitable semi-conductive material having P-type properties. Thus the body 10 may be formed of germanium, of silicon-germanium alloy as disclosed in co-pending application Ser. No. 375,416, filed August 20, 1953, or of silicon alone.

Main constituent of alloy pellet

In the example given above the main constituent of the alloy pellet 11 was indium, the same P-type material used to "dope" the main body 10. By analogy, any similar P-type material, such as aluminum may be used as the main constituent of the alloy pellet.

It is also possible to use for the main constituent of the alloy pellet 11 any metal, such as lead, tin, or gold, which is relatively inert as an impurity in the material of the main body 10.

An important feature of this invention is the fact that the pellet 11 includes a slow-diffusing P-type material and a rapid-diffusing N-type material.

Slow-diffusing P-type material

In the example given above the characteristics of the first diffusion layer depend upon the fact that indium is a relatively slow-diffusing P-type material. Another slow-diffusing P-type material that may be used similarly is gallium, which diffuses even more slowly than indium.

The percentages of these materials to be used is dependent upon the segregation coefficient of the particular material at the particular temperature used in the alloying process. Thus indium has a low segregation coefficient relative to other usable materials, and it is therefore necessary to have a relatively large amount present in the pellet 11. Note that in the example given above the pellet 11 included 99.9% of indium.

On the other hand, gallium has a relatively high segregation coefficient, and a much smaller amount of it can be used. For example, if the main constituent of pellet 11 is lead, it is possible to use 1% of gallium with ½% of arsenic. (See next section.)

Rapid-diffusing N-type material

In the example given above the characteristics of the second diffusion layer depend upon the fact that arsenic is a relatively rapid-diffusing N-type material. Another rapid-diffusing N-type material that may be used similarly is antimony. These two materials have approximately the same diffusion rates. Lithium is another N-type material having a rapid rate of diffusion. Its diffusion rate in germanium is very rapid, but in silicon and germanium-silicon alloys, is not as rapid as in germanium.

Arsenic has a relatively high segregation coefficient, and therefore it can be used in relatively small amounts. In the main example given above the pellet 11 consists of 99.9% indium and 0.1% arsenic. In the example given in the last section the alloy included 1% of gallium and ½% of arsenic, balance lead.

Antimony has a lower segregation coefficient, and therefore it should be present in larger amounts. For example, a suitable alloy would consist of 1% gallium, 3% antimony, balance lead.

In connection with all of the percentages mentioned above it should be noted that the figures given depend very largely on the temperature at which the pellet is to be alloyed to the main body, as the values used in determining the composition of the alloys are very sensitive to temperature and, to a lesser extent, to the resistivity of the base material.

B. MAIN BODY HAVING N-TYPE PROPERTIES

It is also possible to use for the main body 10 any suitable semi-conductive material having N-type properties. These materials include germanium, silicon, or germanium-silicon alloys, doped with an N-type impurity. In this case the main constituent of the alloy pellet would be an N-type material.

The other constituent of the alloy pellet would be P-type material that diffuses faster than the N-type material in the pellet. One such fast-diffusing P-type material is copper, which diffuses quite rapidly.

C. DEVICES USING THE IMPROVED HOOK COLLECTOR

The improved hook collector of the present invention has advantages that make possible its use in new types of transistors. Due to the fact that it is produced by alloying a separately produced alloy pellet onto a body of base material, it is possible to place the hook collector at any preferred location on the body. Thus, the body may be a thin, flat piece of material, and the hook collector may be formed on one face of the flat material. This makes possible several new types of transistors, as will now be explained.

One such new type of transistor is illustrated in Figs. 4 and 5, where 11 indicates the button of alloy, and 10 represents the main body of "base" material. The first diffusion layer 13 and the second diffusion layer 14 constitute the hook collector as described above. Since the hook collector is located on top of body 10, it is possible to locate a point contact emitter 16 on the same surface with, and to one side of, the hook collector, as clearly shown in Figs. 4 and 5. A piece of electrically conductive material 17 is attached to the opposite side of body 10, and a lead 18 is connected to the material 17 to form the "base" connection.

In the operation of the device of Figs. 4 and 5, "holes" carry current from the hook collector through the body 10 of "base" material, to the "base" contact 17. This current carried by the "holes" is indicated by the heavy dot-dash lines 19 of Fig. 4.

A current of electrons flows from the emitter 16, some of whcih flow through the 2nd diffusion layer 14 of the hook collector, where they act as a control for the current 19. Others of these electrons will flow to the "base" contact 17. This electron current is indicated by the light dash lines 20 of Fig. 4.

The arrangement of transistor parts described above is of particular benefit, since it is desirable to keep the "hole" current 19 from going to the emitter, and this result is substantially accomplished by locating the point contact emitter on the same surface with, and to one side of the collector. This arrangement helps to make the device short-circuit stable.

Figure 7:
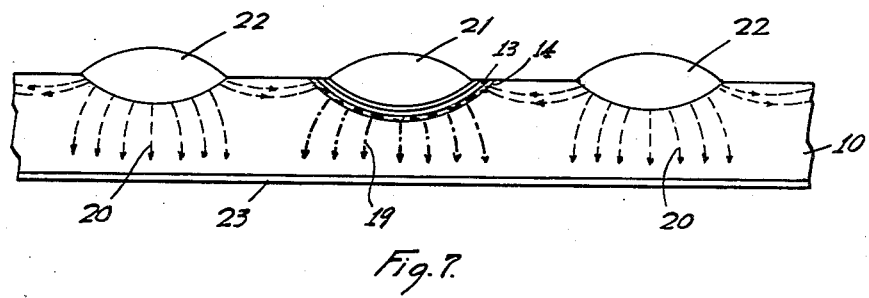
Fig. 7 is a diagrammatic fragmentary cross section of the device of Fig. 6.

Another arrangement of transistor parts is shown in Figs. 6 and 7, which involves the use of two comb-like structures. One of these combs, 21, represents an alloy hook collector formed by the method of this invention, and the other comb, 22, represents an emitter alloyed to the body 10. These two combs are interleaved and are located on the same surface of a body 10 of "base" material. A piece of electrically conductive material 23 is attached to the opposite side of the body 10 to form a "base" connection. The collector lead is shown at 24, the emitter lead at 25 and the base lead at 26.

The comb-like collector body 21 may be stamped out of a piece of the desired alloy, and alloyed to the body 10 by the method described above to produce an alloy hook collector. The emitter comb 22 may be stamped from a piece of material suitable for an emitter and alloyed to body 10.

An alternate method of producing the combs 20 and 21 is to evaporate the proper materials in the desired patterns on the surface of body 10, and to subject the resulting combs to alloying processes as described above.

Some of the advantages of the comb-type arrangement of Fig. 6 become apparent from Fig. 7, which is a diagrammatic cross section through one finger 21 of the collector comb and through two adjacent fingers 22 of the emitter comb. This diagram illustrates the theory that there is a flow of "holes" carrying current from the hook collector 21 through the body 10 of "base" material to the "base" contact 23. This flow is indicated by the heavy dot-dash lines 19.

There is also a flow of electrons from the emitters 22, some of the electrons going to the "base" contact 23, and some flowing from each of the emitters through the layer 14 of the hook collector to control the current 19. This electron flow is indicated by the light dash lines 20.

It has previously been proposed to use inter-leaved comb-type collectors and emitters, but in the absence of the alloy hook collector of the present invention, the current 19 flowing from the collector to the base contact was not possible. The presence of this current gives a tremendous increase in power gain. Thus, where the previously proposed structure would give a power gain of 10, the improved structure using the new alloy hook collector gives a power gain of 1,000.

Figure 8:
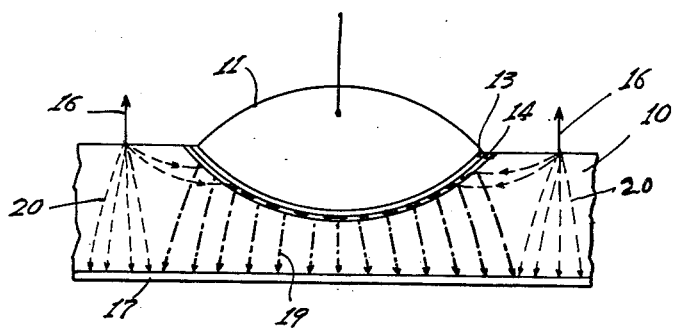
Fig. 8 is a diagrammatic cross section of another type of transistor.

Fig. 8 illustrates another arrangement in which a large alloy hook collector is alloyed to the surface of the body 10, and emitters 16 are placed on opposite sides of the hook collector. In this case electron flow 20 from one emitter flows into the 2nd diffusion 14 layer from one side of the hook collector, and electron flow 20 from the other emitter flows into the 2nd diffusion layer 14 from the opposite side. In this case the flow 19 is under partial control of each of the emitters. The use of two emitters to control a single collector is useful in devices such as phase measuring devices.

The term "large" when used in connection with Fig. 8 means that the alloy hook collector is substantially larger than those used in the devices of Figs. 1 to 4 inclusive. In technical terms the word "large" as used to describe the alloy hook collector of Fig. 8 means large enough to permit the establishment of a potential difference between one edge of the hook collector region and the other edge. If the resistance of the hook region is very high, such as one million ohms per square, "large" might be 1 mm. diameter for the alloy button. If the resistance is low, say 10,000 ohms per square, "large" may be 2 cm. diameter of the button.

Figure 10:
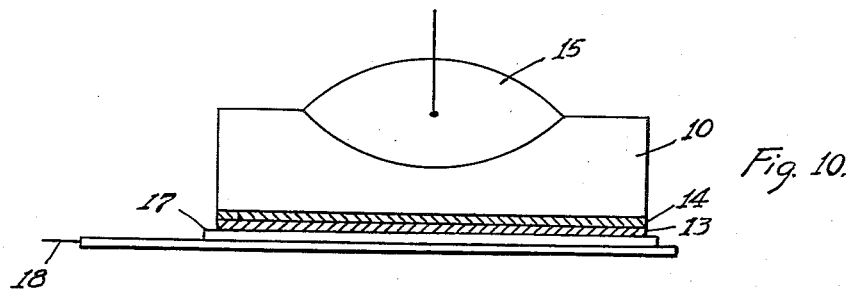
Fig. 10 is a view showing the application of the present invention to the device of Fig. 9.

Fig. 10 illustrates the application of the invention to form a semi-conductor rectifier.

Figure 9:
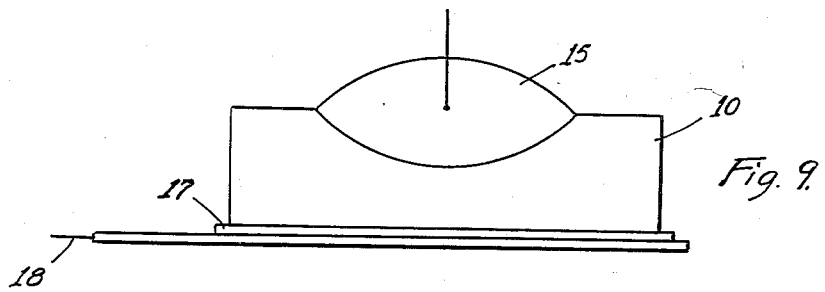
Fig. 9 is a diagram illustrating a known type of semiconductor rectifier.

A known type of semi-conductor rectifier is shown in Fig. 9, where 10 represents a body of P-type base material, 15 is an emitter of suitable N-type material, and 17 is a collector lead to which a conductor 18 is attached. In this type of rectifier it is desirable to keep the base region thin so that there will be little contribution to the forward resistance of the rectifier due to bulk resistivity of the base region. However, the material used to make the collector contact 17, e. g. tin, may cause a high recombination rate at the collector contact, giving a large supply of minority carriers which may diffuse through body 10 to the emitter 15, under reverse polarity, contributing to the leakage current. This will decrease the rectification ratio.

Fig. 10 illustrates the application to this type rectifier of a hook collector according to the present invention. The hook collector, consisting of the first diffusion layer 13 and the second diffusion layer 14, is located between the collector contact 17 and the body 10 of base material. With this construction some of the minority carriers (electrons) from base 10 will travel to the hook region, under reverse polarity for the rectifier, and will be collected by the hook, instead of contributing to the saturation current. Also, electrons which are contributed by regeneration at the collector contact will not reach the emitter 15, because they are impeded by a potential barrier at the hook. For these reasons the leakage current is reduced, and the rectification ratio is increased.

As a specific example of possible materials, in Fig. 10 the main body 10 may be formed of P-type silicon, and the contact 17 may be of lead containing small amounts of aluminum and lithium. Since aluminum is a slow-diffusing P-type material, the first diffusion layer 13 will be P-type because of the influence of aluminum in this layer. Lithium, being a fast-diffusing N-type material, will cause the second diffusion layer to be N-type. The conductor 18 may be of molybdenum.

Figure 11:
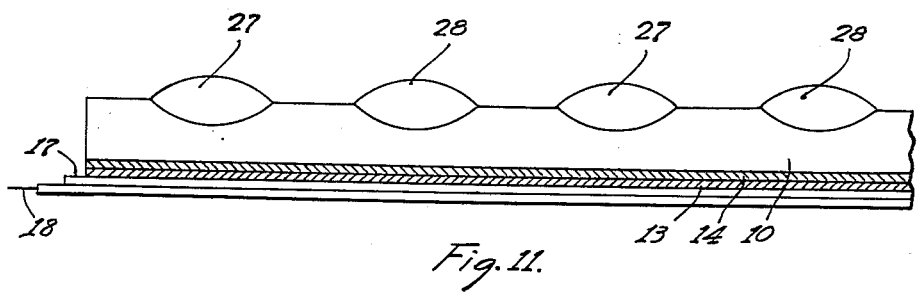
Fig. 11 is a diagram illustrating another form of transistor device using the present invention.

In the device illustrated in Fig. 11, the lower part is similar to the lower part of Fig. 10 in that a hook collector comprising diffusion layers 13 and 14 is located between the collector contact 17 and the body 10. However, the upper part of Fig. 11 includes alternate emitters 27 and base elements 28. These emitters 27 and base elements 28 are preferably formed of two interleaved combs as in Fig. 6. The upper part of Fig. 11 represents a cross-section through the fingers of the combs as in the upper part of Fig. 7.

In Fig. 11 the emitters 27 may be formed of lead "doped" with an N-type impurity, such as antimony. The base elements 28 may be formed of lead "doped" with a P-type impurity, such as indium. The elements 27 and 28 are alloyed to body 10. The diffusion layers 13 and 14 may be formed by using an alloy of 95% aluminum and 5% lithium and the body 10 may be formed of silicon or of silicon-germanium alloy, preferably "doped" with a P-type impurity. The diffusion layers are formed in the manner described above.

In the construction of Fig. 11 the base and emitter connections are on the same side of the body 10, and since only small voltages are applied from base to emitter, these elements may be placed close to each other with little possibility of surface leakage. Moreover, there is a good ohmic connection from the base elements to the body 10.

CONCLUSION

The many advantages of the improved hook collector of this invention will be apparent to those skilled in the art.

It will of course be understood that the specific materials mentioned above are merely illustrative examples, and that any materials having similar properties may be substituted.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim as my invention:

1. In the method of producing a hook collector, the steps comprising applying a solid member comprising a slow diffusing P-type impurity and a fast diffusing N-type impurity to a solid body of a semi-conductor material having P-type semi-conductivity, the semi-conductor material being selected from the group consisting of silicon, germanium and silicon-germanium alloys, the solid member containing the P-type impurity in such amounts as compared to the N-type impurity that when both are present in their respective amounts in the semi-conductor material the material will have P-type semi-conductivity, heating the assembly of the solid member and the solid body to a first temperature to cause the member to fuse and alloy with a part of the body of semi-conductor material, cooling the assembly to a mean temperature of the order of 20° C. below said first temperature and maintaining the assembly at the lower temperature so that the body of semiconductor material is slightly cooler than the molten alloy for a period of time to redeposit a thin layer of the semi-conductor material from the molten alloy upon the semi-conductor body and to diffuse the P-type and N-type impurities into the body of semi-conductor material thereby producing a uniformly thin first diffusion layer adjacent the member wherein the P-type impurity predominates and imparts P-type semi-conductivity to said first diffusion layer, and producing immediately beyond the first diffusion layer a second uniform and extremely thin second diffusion layer wherein the N-type impurity predominates and imparts N-type semi-conductivity to said second layer, and cooling the assembly to room temperature whereby a unitary hook collector results.

2. In the method of producing a hook collector, the steps comprising applying a solid member comprising a slow diffusing N-type impurity and a fast diffusing P-type impurity to a solid body of a semi-conductor material having N-type semi-conductivity, the semi-conductor material being selected from the group consisting of silicon, germanium and silicon-germanium alloys, the solid member containing the N-type impurity in such amount as compared to the P-type impurity that when both are present in their respective amounts in the semi-conductor material the material will have N-type semi-conductivity, heating the assembly of the solid member and the solid body to a first temperature to cause the member to fuse and alloy with a part of the body of semi-conductor material, cooling the assembly to a mean temperature of the order of 20° C. below said first temperature and maintaining the assembly at the lower temperature so that the body of semiconductor material is slightly cooler than the molten alloy for a period of time to redeposit a thin layer of the semi-conductor material from the molten alloy upon the semi-conductor body and to diffuse the P-type and N-type impurities into the body of semi-conductor material thereby producing a uniformly thin first diffusion layer adjacent the member wherein the N-type impurity predominates and imparts N-type semi-conductivity to said first diffusion layer, and producing immediately beyond the first diffusion layer a second uniform and extremely thin diffusion layer wherein the P-type impurity predominates and imparts P-type semi-conductivity to said second layer, and cooling the assembly to room temperature whereby a unitary hook collector member results.

3. In the method of producing a hook collector, the steps comprising applying a solid member comprising a first slow diffusing doping impurity and a second faster diffusing doping impurity to a solid body of semi-conductor material suitable for preparing transistors therefrom and alloyable with the solid member, the semi-conductor material being selected from the group consisting of silicon, germanium and silicon-germanium alloys, and having a semi-conductivity corresponding to that producible by the first doping impurity, the solid member containing the first type of doping impurity in such amount as compared to the quantity of the second type of doping impurity that when both are present in their respective proportions in the semi-conductor material the material will have the semi-conductivity conferred by the first type of impurity, heating the assembly of solid member and solid body to a first temperature to cause the member to fuse and to dissolve and alloy with some of the semi-conductor material, cooling the assembly to a mean temperature of the order of 20° C. lower than said first temperature while maintaining a gradient so that the solid body of semi-conductor is at a lower temperature than the molten member so that a layer of the semiconductor material redeposits from the molten member, maintaining the assembly at the lower temperature for a period of time whereby the first and second doping impurities both diffuse into the body of semi-conductor material, thereby producing a uniformly thin first diffusion layer adjacent the member wherein the first slow-diffusing doping impurity predominates and imparts to said first diffusion layer the same type of conductivity as was originally present in the body of semi-conductor material, and producing immediately beyond the first diffusion layer a second uniform and extremely thin diffusion layer in which the faster diffusing impurity predominates thereby imparting to said second diffusion layer the opposite type of conductivity, the redeposited layer also having the same conductivity as the first diffusion layer, and cooling the assembly to room temperature whereby a unitary hook collector member results.

4. The method of producing a hook collector which comprises: providing a piece of alloy containing a small percentage of lithium together with a higher percentage of a slower diffusing P-type doping material, placing the alloy piece on a body of silicon having P-type conductivity to form an assembly, heating the assembly to a first temperature to cause the piece to fuse and to alloy with a part of the silicon in the body, cooling the assembly to a mean temperature of the order of 20° C. below said first temperature, the body being maintained at a slightly lower temperature than the fused piece so that some of the silicon redeposits from the fused piece as a thin layer on the body, and holding the assembly at such lower temperature for a diffusion period during which the lithium and the P-type doping material diffuse into the body of silicon, the P-type doping material of the alloy predominating in a first uniformly thin diffusion layer to impart to said first diffusion layer P-type conductivity, and the lithium diffusing farther into the body to form a second uniform and extremely thin diffusion layer in which it predominates and accordingly said second diffusion layer having N-type conductivity, the two diffusion layers being usable as a hook collector.

5. The method of producing a hook collector which comprises: providing a piece of alloy containing a small percentage of lithium, the balance being aluminum, placing the alloy piece on a body of silicon having P-type conductivity to form an assembly, heating the assembly to a first temperature to cause the piece to melt and to alloy with some of the silicon in the body, cooling the assembly to a mean temperature of the order of 20° C. below said first temperature, the body being maintained at a slightly lower temperature than the fused piece so that some of the silicon redeposits from the fused piece as a thin layer on the body, and holding the assembly at such lower temperature for a diffusion period during which the lithium and the aluminum diffuse into the body of silicon, the aluminum predominating in a first uniformly thin diffusion layer to impart to said first layer P-type conductivity, and the lithium diffusing farther into the body to form a second uniform and extremely thin diffusion layer in which the aluminum predominates and accordingly said second layer will have N-type conductivity, these two diffusion layers forming a hook collector.

6. The method of producing a hook collector which comprises: providing a piece of an alloy comprising a large proportion of a slow diffusing P-type doping impurity selected from the group consisting of aluminum, gallium and indium and a small proportion of a rapid diffusing N-type doping impurity selected from the group consisting of antimony, lithium and arsenic, placing the alloy piece on a body of germanium having P-type conductivity to form an assembly, heating the assembly to a first temperature of about 570° C. to cause the piece of the alloy to fuse to and dissolve and alloy with a part of the germanium body, cooling the assembly to a mean temperature of the order of 20° C. lower than said first temperature, while maintaining a gradient so that the body of germanium is slightly cooler than the molten alloy, whereby a thin layer of germanium redeposits on the body of germanium, and holding the assembly at such lower temperature for a diffusion period during which the P-type and N-type impurities diffuse into the body and the P-type impurity predominates in a first uniformly thin diffusion layer, said first layer accordingly having P-type conductivity, and the N-type impurity diffuses farther into the germanium body to form a second uniform and extremely thin diffusion layer in which it predominates, said second layer accordingly having N-type conductivity, these two diffusion layers forming a hook collector.

7. The method of producing a hook collector which comprises: providing a piece comprising an alloy of indium with about 0.1% of arsenic, placing the piece of alloy on a body of germanium having P-type conductivity to form an assembly, heating the assembly to a temperature of about 570° C. to cause the piece of alloy to fuse and to alloy with some of the germanium body, cooling the assembly to a mean temperature of about 550° C. while subjecting the assembly to a gradient cooling during which the liquid alloy is slightly hotter than the body of germanium so that a thin layer of germanium redeposits on the body, and holding the assembly at the lower temperature for a diffusion period of the order of ½ to 1 hour during which the indium and arsenic diffuse into the body, and the indium predominates in a first uniformly thin diffusion layer, said first layer accordingly having P-type conductivity and the arsenic diffuses farther into the germanium body to form a second uniform and extremely thin diffusion layer in which it predominates, said second layer accordingly having N-type conductivity, these two diffusion layers forming a hook collector.

References Cited in the file of this patent

UNITED STATES PATENTS

| | | |
|---|---|---|
| 2,428,992 | Ransley | Oct. 14, 1947 |
| 2,449,484 | Jaffee | Sept. 14, 1948 |
| 2,567,970 | Scaff | Sept. 18, 1951 |
| 2,569,347 | Shockley | Sept. 25, 1951 |
| 2,629,672 | Sparks | Feb. 24, 1953 |
| 2,637,770 | Lark-Horovitz | May 5, 1953 |
| 2,644,852 | Dunlap | July 7, 1953 |
| 2,701,326 | Pfann | Feb. 1, 1955 |
| 2,725,315 | Fuller | Nov. 29, 1955 |

FOREIGN PATENTS

| | | |
|---|---|---|
| 510,303 | Belgium | Apr. 15, 1952 |